(12) United States Patent
Kuipers et al.

(10) Patent No.: US 11,722,172 B2
(45) Date of Patent: Aug. 8, 2023

(54) OPERATING AN ACCESS SERVICE

(71) Applicant: ADTRAN GmbH, Berlin (DE)

(72) Inventors: Martin Kuipers, Dallgow-Döberitz (DE); Nils Asmussen, Berlin (DE); Uwe Jank, Falkensee (DE)

(73) Assignee: ADTRAN GmbH, Berlin (DE)

( * ) Notice: Subject to any disclaimer, the term of this patent is extended or adjusted under 35 U.S.C. 154(b) by 84 days.

(21) Appl. No.: 16/774,985

(22) Filed: Jan. 28, 2020

(65) Prior Publication Data

US 2020/0244309 A1    Jul. 30, 2020

(30) Foreign Application Priority Data

Jan. 29, 2019 (EP) .................... 19154212

(51) Int. Cl.
*H04B 3/32* (2006.01)
*H04B 3/487* (2015.01)
*H04M 11/06* (2006.01)
*H04M 19/08* (2006.01)

(52) U.S. Cl.
CPC ............. *H04B 3/32* (2013.01); *H04B 3/487* (2015.01); *H04M 11/062* (2013.01); *H04M 19/08* (2013.01)

(58) Field of Classification Search
CPC ....... H04B 3/32; H04B 3/487; H04M 11/062; H04M 19/08
See application file for complete search history.

(56) References Cited

U.S. PATENT DOCUMENTS

| 7,035,400 | B1 * | 4/2006 | Gaikwad | H04L 5/143 370/298 |
| 9,774,367 | B2 * | 9/2017 | Yang | H04L 12/2878 |
| 2009/0073868 | A1 * | 3/2009 | Guenach | H04B 3/487 370/201 |
| 2012/0020277 | A1 * | 1/2012 | Kanellakopoulos | H04L 5/1461 370/315 |
| 2015/0229355 | A1 * | 8/2015 | Drooghaag | H04M 3/34 379/3 |
| 2016/0094273 | A1 * | 3/2016 | Yin | H04B 3/50 379/406.01 |
| 2016/0119026 | A1 * | 4/2016 | Strobel | H04B 3/487 370/201 |
| 2016/0205264 | A1 * | 7/2016 | Kerpez | H04B 15/005 379/406.01 |
| 2017/0118350 | A1 * | 4/2017 | Linney | H04B 3/32 |
| 2017/0201292 | A1 * | 7/2017 | Yang | H04M 3/30 |

FOREIGN PATENT DOCUMENTS

| EP | 3012979 A2 * | 4/2016 | ............ H04M 3/007 |
| EP | 3012979 A2 | 4/2016 | |
| EP | 3193458 A1 | 7/2017 | |

* cited by examiner

*Primary Examiner* — Steven H Nguyen
(74) *Attorney, Agent, or Firm* — Butler Snow LLP; Jon E. Holland

(57) ABSTRACT

A method for operating a first access service depends on the presence of a second access service. The method includes conducting at least one measurement by the first access service and determining based on the at least one measurement whether or not a power spectral density used by the first access service is adjusted.

16 Claims, 3 Drawing Sheets

OPERATING AN ACCESS SERVICE

CROSS REFERENCE TO RELATED APPLICATION

This application claims priority to European Patent Application No. 19154212.5, entitled, "Operating an Access Service," and filed on Jan. 29, 2019, which is incorporated herein by reference.

RELATED ART

Examples described herein relate to an operation of an access service, in particular a G.fast service, in the presence of another access service.

xDSL (also referred to as DSL) is a family of technologies that provide digital data transmission over the wires of a local telephone network.

Data transmission via copper-based access networks is facilitated via xDSL based on ITU-T specifications G.99x.y. G.fast services may be implemented based on ITU-T specifications G.9700 and G.9701. G.fast provides higher data rates compared to xDSL.

High data rates may be based on short subscriber lines. Hence, the migration towards G.fast may require a change of the CPE as well as a change of the network topology.

A network operator provides xDSL services that are supported by an Access Node (AN) located in the Central Office (a building) or in a cabinet (in the street). The AN may also be referred to as DSLAM or MSAN.

A new service might be deployed via ANs that are referred to as Distribution Point Units (DPUs), which support G.fast on the existing copper wires. The DPU may be deployed at a location different from the existing AN. For example, the DPU can be deployed in a basement of a building as Fiber to the Building (FTTB), in an outside Distribution Point as Fiber to the Distribution Point (FTTDP) or in an outside Cabinet as Fiber to the Cabinet (FTTC).

When the end user subscribes to the new service the subscriber line (a pair of copper wires) need to be rewired or switched from the existing AN (a DSLAM) to the new AN (a DPU). Also, the end user needs a CPE (Customer Premises Equipment) that is capable of utilizing this new service.

In an exemplary use case, a G.fast distribution point unit (DPU) may be installed in the basement of the building using existing telephone wires in the building to provide high-speed internet access. The uplink from the DPU towards the network is realized in most cases by a different technology, like an optical fiber.

However, in some cases not all subscribers of the building may be served by the G.fast DPU. Some of them might get cabinet based VDSL2 from the same or from a different operator. Due to the crosstalk between the different twisted pairs (i.e. telephone wires) inside the building, a coexistence of the two technologies VDSL2 and G.fast needs to be considered. Traditionally, such coexistence is achieved by frequency separation such that G.fast is launched above the VDSL2 frequency range. For example, for reasons of coexistence with a VDSL2 profile 17a it is common to start G.fast from 20 MHz on, while profile 35b requires to vacate the spectrum below 40 MHz. This will lower the G.fast data rate and/or the reach of the G.fast service offerings. It is therefore desirable to vacate the VDSL2 spectrum only when it is required, i.e. in case VDSL2 is actually used and contributes to crosstalk or in case VDSL2 is disturbed by G.fast. If, however, VDSL2 is not used, G.fast may be run with a broader frequency range, e.g., starting at 2.2 MHz, which results in an increased data rate.

One of the problems is that the presence of VDSL2 might not be known a-priori.

Hence, it is an object to improve existing approaches and in particular to provide a solution that efficiently improves the coexistence of VDSL2 and G.fast services. This problem is solved according to the features of the independent claims. Further embodiments result from the depending claims.

SUMMARY

The examples suggested herein may in particular be based on at least one of the following solutions. In particular, combinations of the following features could be utilized in order to reach a desired result. The features of the method could be combined with any feature(s) of the device, apparatus or system or vice versa.

A method is provided for operating a first access service depending on the presence of a second access service comprise conducting at least one measurement by the first access service and determining based on the at least one measurement whether or not a power spectral density used by the first access service is adjusted. This solution is in particular useful in case there is no (direct) crosstalk cancellation between the first access service and the second access service.

The adjustment of the power spectral density (PSD) is performed by the first access service and the second access service might be agnostic about the presence of the first access service. For example, transmitted PSDs of the CPE/FTU-R transmitter (in upstream direction) and/or of the DPU/FTU-O transmitter (in downstream direction) may be adjusted. In particular, several PSDs, e.g., two PSDs per line, may be adjusted. The adjustments may affect a start frequency or a frequency range or several frequency ranges.

Hence, this solution is beneficial if the second access service is a legacy service, which is gradually updated towards the first access service.

According to an embodiment, the first access service is a communication service utilizing a predetermined number of first lines, the second access service is a communication service utilizing an unknown number of second lines, and at least one of the first lines and at least one of the second lines share the same cable binder.

According to an embodiment, the first access services is a G.fast service or a service that is based on a G.fast service.

According to an embodiment, the second access services is an xDSL service.

According to an embodiment, adjusting the power spectral density comprises at least one of the following: adjusting at least one power spectral density level, adjusting a start frequency of a frequency band, adjusting at least one frequency of the frequency band, and adjusting at least one frequency range of the frequency band, wherein the frequency band is used by the first access service.

Hence, start frequencies may be adjusted or even shifted. Also, certain areas (frequencies or frequency ranges) in the frequency band may be adjusted.

Although examples described herein relate to the start frequency of the frequency band of the first access service, other solutions may apply accordingly considering a at least one frequency or at least one frequency range within the frequency band of the first access service. Such at least one frequency or frequency range may be adjusted, e.g., shifted or transformed.

According to an embodiment, the at least one measurement detects a crosstalk that results from the second access service.

According to an embodiment, the at least one measurement is conducted by a G.fast DPU and/or by at least one G.fast CPE.

According to an embodiment, the power spectral density is adjusted as follows: a start frequency of the first access service is set to a first value if the at least one measurement indicates the presence of crosstalk, or the start frequency of the first access service is set to a second value if the at least one measurement indicates the absence of crosstalk, wherein the first frequency is higher than the second frequency.

Hence, in case G.fast is the first access service, the start frequency of the G.fast service is selected such that the spectrum of the second access service is (substantially) not used for G.fast transmission purposes.

According to an embodiment, the start frequency is set for each line at the same time, at substantially the same time, within a predetermined time interval or when the line is being initialized or re-initialized.

According to an embodiment, several measurements on different lines are conducted at the same time or they are spread on different lines over time.

Also, a system is suggested, which provides a first access service, wherein the system is arranged to conduct at least one measurement; determine based on the at least one measurement whether or not a power spectral density used by the first access service is adjusted; and adjust the power spectral density of the first access service accordingly or conduct no adjustment of the power spectral density.

According to an embodiment, the system comprises at least one of the following: a DPU; and a management system to configure the DPU. The management system may be an internal or an external management system. The management system may be cloud-based and/or supplied by an operator or provider of the first access service.

According to an embodiment, the first access service is a communication service utilizing a predetermined number of first lines, the second access service is a communication service utilizing an unknown number of second lines, and at least one of the first lines and at least one of the second lines share the same cable binder.

Hence, the solution is capable to determine whether no line or at least one line is used by the second access service. If at least one line is used by the second access service, the first access service utilizes a reduced frequency range compared to the scenario where the second access service is not used on any of the lines of the cable binder.

It is noted that the number of lines used by the second access service may change over time. At some point in time, there may be no second access service present on any of the lines and at some other point in time, the second access service may be (re-)activated on at least one of the lines of the cable binder.

According to an embodiment, the first access services is a G.fast service or a G.fast-based service and wherein the second access services is an xDSL service.

A computer program product is suggested, that is directly loadable into a memory of a digital processing device, comprising software code portions for performing the steps of the method as described herein. The digital processing device may be a single physical unit or it may comprise several physical units, each providing processing capability.

A computer-readable medium is provided, which has computer-executable instructions adapted to cause a computer system to perform the steps of the method as described herein.

According to an exemplary embodiment, measurements are used that are available in a G.fast DPU to detect the presence of VDSL2 crosstalk. If the DPU has detected that VDSL2 is used in the same cable binder, the start frequency of the G.fast service will be selected such that the VDSL2 spectrum is not used for G.fast transmission.

The cable binder may comprise at least one line used for the G.fast service and at least one line that may be used for the VDSL2 service. It is an option, that not a single line of the cable binder may temporarily be used for the VDSL2 service. This, however, may not be known a priori to the operator or provider of the G.fast service.

The transmit power spectral density (PSD) of the G.fast service may be adapted such that there is no (relevant) detrimental impact on the VDSL2 service.

On the other hand, i.e. in case a system comprising the DPU has sufficient confidence that no VDSL2 is used in the same cable binder, a lower start frequency can be selected.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
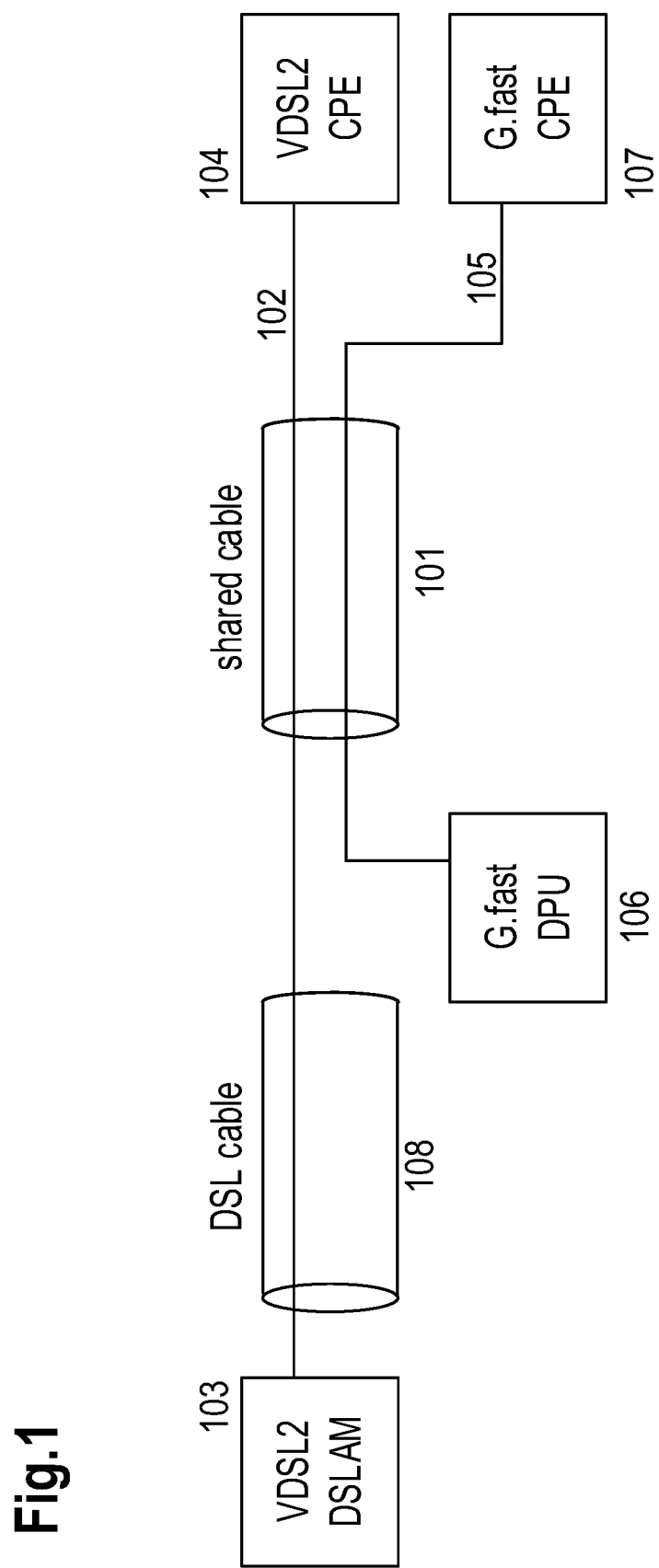
FIG. 1 shows an example of a G.fast deployment scenario.

FIG. 1 shows an example of a G.fast deployment scenario. A shared cable 101 (also referred to as cable binder) comprises a twisted pair 102 that connects a VDSL2 DSLAM 103 and a VDSL2 CPE 104 and a twisted pair 105 that connects a G.fast DPU 106 and a G.fast CPE 107. The shared cable 101 also comprises the twisted pair 105. The twisted pair 102 may partially also be part of a DSL cable 108.

G.fast is deployed from the G.fast DPU 106, which may in particular be located in close proximity to or inside a building. Not all customers may receive G.fast services from the G.fast DPU 106; some customers are served VDSL2 services from the VDSL2 DSLAM 103 which may be located in a cabinet or a central office (CO).

Hence, G.fast and VDSL2 signals use the same shared cable 101 where crosstalk between the access services VDSL2 and G.fast may occur. The VDSL2 signal creates noise on the G.fast lines with specific characteristics. The crosstalk caused by the VDSL2 service is a disturbance to the G.fast service or vice versa crosstalk caused by the G.fast service is a disturbance to the VDSL2 service, which in particular comprises Far-End-Crosstalk (FEXT) and Near-End-Crosstalk (NEXT) from the VDSL2 DSLAM 103 and VDSL2 CPE 104 to the G.fast DPU 106 and G.fast CPE 107.

In order to detect the presence of VDSL2 services, test parameters as specified in the G.fast recommendation ITU-T G.9701 may be used. This recommendation ITU-T G.9701 specifies the measurement procedure for Quiet Line Noise (QLN) and Active Line Noise (ALN). Separate measurements are available for up- and downstream direction involving the G.fast DPU 106 as well as the G.fast CPE 107.

Depending on the measurement used (e.g., ALN or QLN), the calculation of the test parameters may be performed at different locations. G.fast allows calculating the ALN by a VCE (Vectoring Control Entity) and QLN for downstream may be calculated at the DPU using DFT output samples from the remote side. Basically, measurements results may be utilized from measurements in the DPU and/or the CPE.

QLN may be preferable over ALN since it does not include residual G.fast crosstalk. QLN may be measured during initialization and it may be updated during showtime. Based on the measurements from the G.fast DPU 106 and G.fast CPE 107, an algorithm may be used to detect if VDSL2 is present in the shared cable 101.

Algorithm to Detect Presence of VDSL2 in Shared Cable

As an example, different VDSL2 detection criteria may be utilized.

The criteria are utilized on DPU side including measurements conducted on both sides (i.e. measurement on the DPU as well as on the CPE side) to ensure an efficient detection of VDSL2 crosstalk.

Difference Between Upstream and Downstream Crosstalk

The crosstalk that stems from VDSL2 upstream (US) and downstream (DS) bands may be different. The different upstream and downstream bands (e.g., US1, US2, DS1, DS2, DS3) for Region Europe are specified in Annex B of G.993.2. Also, different Annexes specify different bands and apply to other regions like, e.g., North America or Japan.

Therefore, the level of crosstalk is compared between VDSL2 US1 and DS2 bands. The US1 band may be selected because the US2 band might not be usable on longer loops and the DS2 band is an adjacent band that is completely located inside the G.fast frequency range.

To estimate the ratio of crosstalk between the US1 band and the DS2 band the average measured QLN values in the US1 band and the DS2 band are calculated and the difference between these values are used as a detection criteria $$US1DS2_{Ratio} = \frac{1}{m_{US1}} \sum_{i \in US1} QLN_i - \frac{1}{n_{DS2}} \sum_{i \in DS2} QLN_i,$$

wherein $m_{US1}$ and $n_{DS2}$ represents the number of QLN values in the bands US1 and DS2.

In some cases, the crosstalk between the different upstream and downstream bands is nearly equal. This happens when the crosstalk on CPE and DPU side have nearly equal effects on downstream and upstream bands. Other criteria may be taken into consideration to tackle this case.

Evaluation of the Edges Between Upstream and Downstream Bands

Another criterion for detecting the presence of VDSL2 crosstalk is derived from the fact that irrespectively of the absolute level of crosstalk, there will be at least one step in the generated noise at the band edge due to alternating upstream and downstream bands. Hence, levels that occur directly at the edges of adjacent bands may be compared. QLN is measured for each tone on a 51.75 kHz grid. In order to avoid effects from non-aligned tones of the two systems and from different implementations that use different gaps between bands, for example five tones left and right of the nominal band edge may be averaged and compared:

$$Edge_{n_{Ratio}} = \left| \frac{1}{5} \sum_{i=1}^{5} QLN_{Edge_n - i} - \frac{1}{5} \sum_{i=1}^{5} QLN_{Edge_n + i} \right|$$

The index i characterizes the index of tone vectors right and left of the nominal tone of the band edge. $QLN_{Edge_n}$ is the QLN value at the nominal band edge n. There are four band edges in the G.fast frequency band since there are DS1, US1, DS2, US2, and DS3.

It is noted that instead of five tones left and right of the nominal band edge, a different number other than five may be used. Hence $$Edge_{n_{Ratio}} = \left| \frac{1}{k} \sum_{i=1}^{k} QLN_{Edge_n - i} - \frac{1}{k} \sum_{i=1}^{k} QLN_{Edge_n + i} \right|,$$

wherein k is advantageously any number between 2 and 7. This could be applicable for any region.

The criterion may be based on the average of all band edge ratios:

$$Edge_{Ratio} = \frac{1}{4} \sum_{n_1}^{n_4} Edge_{n_{Ratio}}$$

Noise Threshold Level

It was mentioned before, that there are some cases, where the $US1DS2_{Ratio}$ criterion and/or the edge criterion may not detect VDSL2 crosstalk in all cases.

However, the detection threshold of the criteria may be configured just above the levels that occur in cases without a VDSL2 disturber being present. This increases the likelihood of false detections. Hence, a third criterion may be used, which is based on the overall noise level observed in the VDSL2 band. It is the average QLN between 2.2 MHz and 17.665 MHz. However, this average QLN level might be affected by other effects that do not relate to VDSL2 crosstalk and the threshold may be selected to avoid any detrimental impact from extrinsic noise. Such an average QLN is a third option to back up the two first criteria:

$$Noise_{threshold} = \frac{1}{m_{2.2\ MHz - 17.664\ MHz}} \sum_{i \in 2.2\ MHz - 17.664\ MHz} QLN_i,$$

where $m_{2.2\ MHz - 17.664\ MHz}$ represents the number of QLN values in the VDSL2 profile 17a frequency range. Also, a portion of this frequency range could be selected instead.

VDSL2 Detection Algorithm

The developed criteria may be used individually, or they may be combined into a single logical value γ that gives information about an alien crosstalk status in the observed loop. If γ is true, there is VDSL2 crosstalk present on the G.fast loop, if false, there is no such VDSL2 crosstalk present.

Each criterion described above may be mapped to a logical value which itself could be used as a logical criterion that is true if the calculated ratio is above a certain threshold or false if it is not. All (or a portion of the) logical values of these criteria may be linked together with a logical "or", which results in said logical value y:

$$\gamma = O_{DPU} \lor \Delta_{DPU} \lor X_{DPU} \lor O_{CPE} \lor \Delta_{CPE} \lor X_{CPE}$$

The logical values may be created as follows depending on the Operator's environment:

$$X_{DPU} = \begin{cases} 1, & Edge_{Ratio_{DPU}} > 2.0 \text{ dB} \\ 0, & Edge_{Ratio_{DPU}} \leq 2.0 \text{ dB} \end{cases}$$

$$X_{CPE} = \begin{cases} 1, & Edge_{Ratio_{CPE}} > 1.4 \text{ dB} \\ 0, & Edge_{Ratio_{CPE}} \leq 1.4 \text{ dB} \end{cases}$$

$$\Delta_{DPU} = \begin{cases} 1, & US1DS2_{Ratio_{DPU}} > 8.4 \text{ dB} \\ 0, & US1DS2_{Ratio_{DPU}} \leq 8.4 \text{ dB} \end{cases}$$

$$\Delta_{CPE} = \begin{cases} 1, & US1DS2_{Ratio_{CPE}} > 6.7 \text{ dB} \\ 0, & US1DS2_{Ratio_{CPE}} \leq 6.7 \text{ dB} \end{cases}$$

$$O_{DPU} = \begin{cases} 1, & Noise_{threshold_{DPU}} > -132.0 \text{ dB} \\ 0, & Noise_{threshold_{DPU}} \leq -132.0 \text{ dB} \end{cases}$$

$$O_{CPE} = \begin{cases} 1, & Noise_{threshold_{CPE}} > -128.0 \text{ dB} \\ 0, & Noise_{threshold_{CPE}} \leq -128.0 \text{ dB} \end{cases}$$

Further Details of the Concept of Crosstalk Detection by a G.fast System

A system where no VDSL2 is present can start G.fast services at a low start frequency (e.g., 2.2 MHz). If VDSL2 services are detected, the G.fast service may start above the used VDSL2 spectrum. In this case and depending on the actually used VDSL2 profile the start frequency for VDSL2 profile 17a could be 20 MHz and the start frequency for VDSL2 profile 35 could be 40 MHz. In this scenario, the detection algorithm is capable of detecting the VDSL2 profile and the start frequency can be selected accordingly.

In an exemplary installation, the G.fast DPU 106 may collect the QLN measurements on a regular basis (e.g., one time in 15 minutes on all lines connected to the G.fast DPU 106) and check for VDSL2 crosstalk. It may be an option to perform such measurements not at the same time for all lines, but spread the measurements on different lines over time, such that a period with no measurement is minimized. This allows detecting most VDSL2 transmissions earlier, because one VDSL2 source may probably be detected on several lines.

After having detected VDSL2 crosstalk on one line, the G.fast start frequency may preferably be raised to a value above the spectrum used by the VDSL2 communication. The change of the start frequency may be executed on all G.fast ports of the G.fast DPU 106 since the crosstalk from one VDSL2 line will in most cases affect more than one line in the same shared cable 101 and any or even all G.fast lines might disturb the VDSL2 line(s).

There exist several options to change the start frequency. One exemplary solution is to specify an appropriate band in RFIBANDS (see clauses 7.3.1.2 and 12.3.2.1.1 of Recommendation G.9701) since this will allow to continue performing QLN measurements in the freed frequency spectrum.

Figure 2:
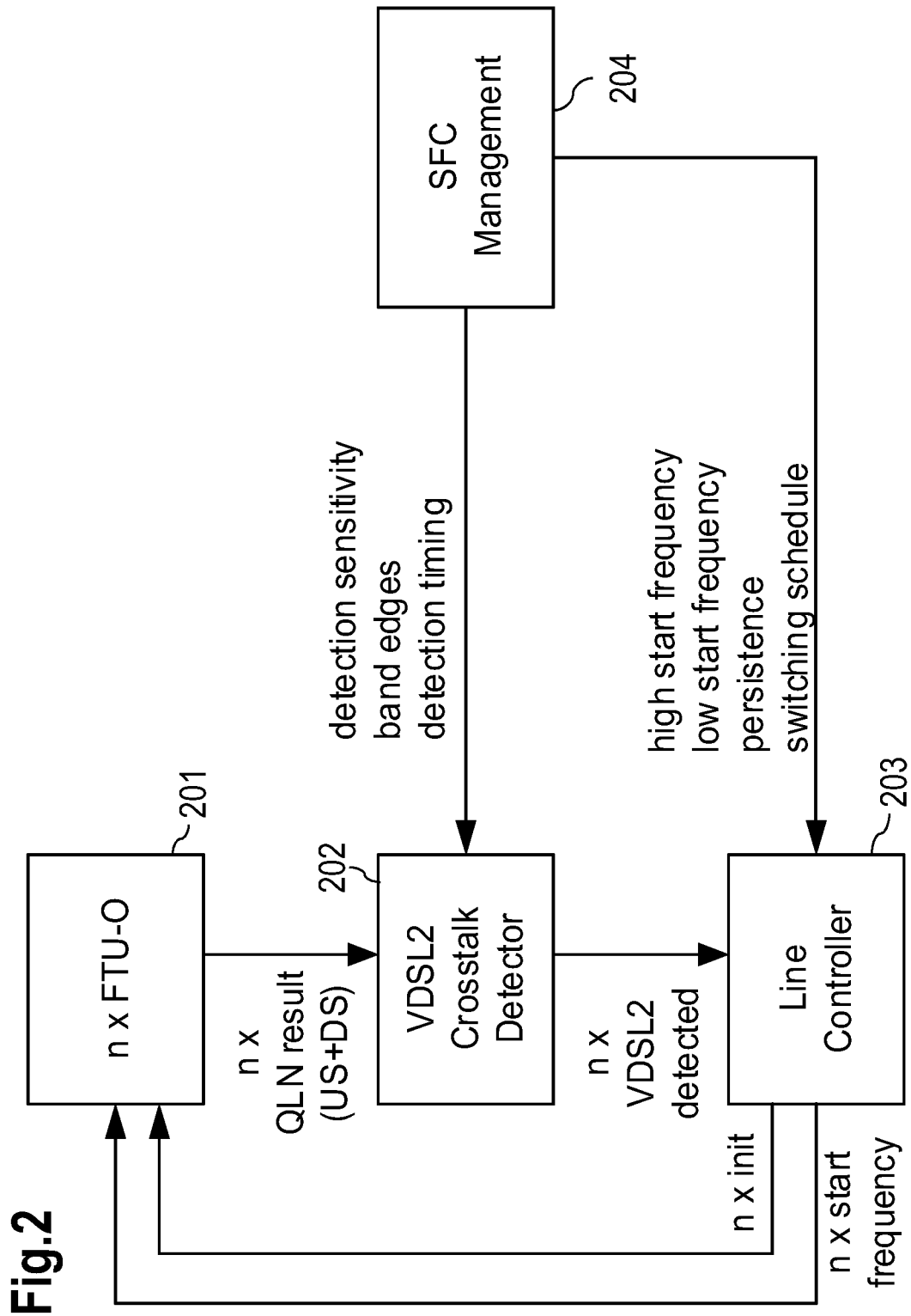
FIG. 2 shows an exemplary diagram that visualizes a flow of information to set and/or update start frequencies of n lines.

FIG. 2 shows an exemplary diagram that visualizes a flow of information to set and/or update start frequencies of n lines.

A G.fast DPU (also referred to herein as DPU) has n G.fast lines that are terminated at a unit 201 comprising n FTU-Os.

The unit 201 further provides QLN results for each of the n lines (in upstream (US) as well as in downstream (DS) direction) to a VDSL2 Crosstalk Detector 202.

The time interval for determining QLN results may be configurable (e.g., in steps of 15 min). For each QLN measurement of each line, the VDSL2 Crosstalk Detector 202 evaluates if there is VDSL2 crosstalk.

The VDSL2 Crosstalk Detector 202 informs a Line Controller 203 about the detection of VDSL2 (crosstalk) for each of the n lines.

The Line Controller 203 sets the start frequencies for the n lines at the unit 201 and it controls the points in time when to (re-)initialize these lines.

The SFC Management 204 may convey to the VDSL2 Crosstalk Detector 202 at least one of the following: a detection sensitivity (see above thresholds), band edges, a detection timing. These values may at least (in part) be configurable by an operator via the SFC management 204.

The SFC Management 204 may convey to the Line Controller 203 at least one of the following: a high start frequency, a low start frequency, a persistence, a switching schedule.

The persistence may indicate how often the absence of VDSL2 needs to be detected before the system assumes that VDSL2 is no longer present.

The switching schedule may indicate how long the current state is maintained even after the detection has changed its result for the logical value y (as described above).

If VDSL2 crosstalk is detected on one or more lines, the start frequency of all lines may be changed to a higher value. Since changing the start frequency may cause a short interruption of the G.fast service, the Line Controller 203 may merely pre-configure the new start frequency. The actual change of the start frequency may then occur when the respective line is (re-)initialized. The initialization can happen anytime for whatever reason. Hence, some lines can already have the high start frequency while other lines still have the low start frequency. To make sure that all lines change within a predetermined period of time, the Line Controller 203 may be requested (e.g., by the switching schedule) to actively force the remaining lines (not yet utilizing the high start frequency) to initialize at a latest or preset point of time (e.g. at night).

If the G.fast start frequency is high and VDSL2 crosstalk is not detected on any line for a preset (e.g., configurable) amount of time, the start frequency of all lines may be lowered. For a change to this lower start frequency the system may have to ensure that the VDSL2 service is decommissioned and not merely interrupted for a short period of time. This means that lack of VDSL2 crosstalk has to be determined for a preset (i.e. "longer") period of time. This can be achieved by monitoring (e.g., for days or weeks) the VDSL2 crosstalk, before a change of the G.fast start frequency is executed. Since changing the start frequency may cause a short interruption of the G.fast service, the Line Controller 203 may only pre-configure the new start frequency. The actual change of the start frequency may then only take place when the respective line initializes. As such initialization may occur anytime for whatever reason, some lines may already utilize the low start frequency while other lines still have the high start frequency. To make sure that all lines change within a predetermined period of time, the Line Controller 203 may actively force the remaining lines (not yet utilizing the low start frequency) to initialize at a latest or at a preset point of time.

It is also an option that depending on a service level agreement an operator may decide to always force a change of the start frequencies immediately for all or the remaining lines. The scheduling of the change of the start frequency may therefore be configurable to flexibly allow the network operator to adapt the settings pursuant to the applicable end user service model.

If it was not possible to measure QLN on a line for a certain amount of time, because this line was not in showtime, the line is initialized with the high start frequency and it may change to the low start frequency after its next regular QLN measurement (or several such next QLN measurements) did not detect any VDSL2 crosstalk. As an alternative, the assigned start frequency of the lines that successfully executed QLN measurements may be used as start frequency for initializing the line for which QLN measurement was not possible.

The functionalities described above may be located in the DPU or they may be distributed across various units, e.g., the DPU, a Persistent Management Agent (PMA), a management system or the like. The SFC Management may at least partially be located in cloud-based computing resources (i.e. some resource that may be accessible via a network, in particular over an IP stack).

Features of upcoming new G.fast recommendations (e.g., referring to future enhancements of showtime reconfiguration) or new functions of the implemented chip sets could provide the possibility to change a transmit power spectral density (PSD) during showtime without service interruption. This may allow changing the start frequency immediately after identification of the VDSL2 crosstalk situation without any service interruption.

To support various service level agreements with connected subscribers, customers of wholesalers and to fulfill legal or regulatory constraints or any other requirements, the DPU and its management system may provide several options for an operator to select a configuration. Hence, the operator is enabled to flexibly adapt its use case scenario. Examples of these several options comprise at least one of the following:

(1) Only measurements are performed and results are reported by the G.fast system (e.g., the DPU); detection algorithms, decisions, re-configuration and triggering re-initialization of the lines may be left to an external system.
(2) Measurements and detection are performed and detection results are reported by the G.fast system; decisions, re-configuration and triggering re-initialization of the lines may be left to an external system.
(3) Fully automated re-configuration and triggering of re-initialization of the lines may be conducted by the G.fast system. In such scenario, advantageously options, parameters and timing are configurable.
(4) Since the decision for a need to change the start frequency may be common and valid for all lines of the DPU, re-configuration and triggering of the re-initialization of lines could be conducted separately for each line (if, e.g., an immediate change of the start frequency is not possible for certain lines) or jointly for all lines of the DPU.

Figure 3:
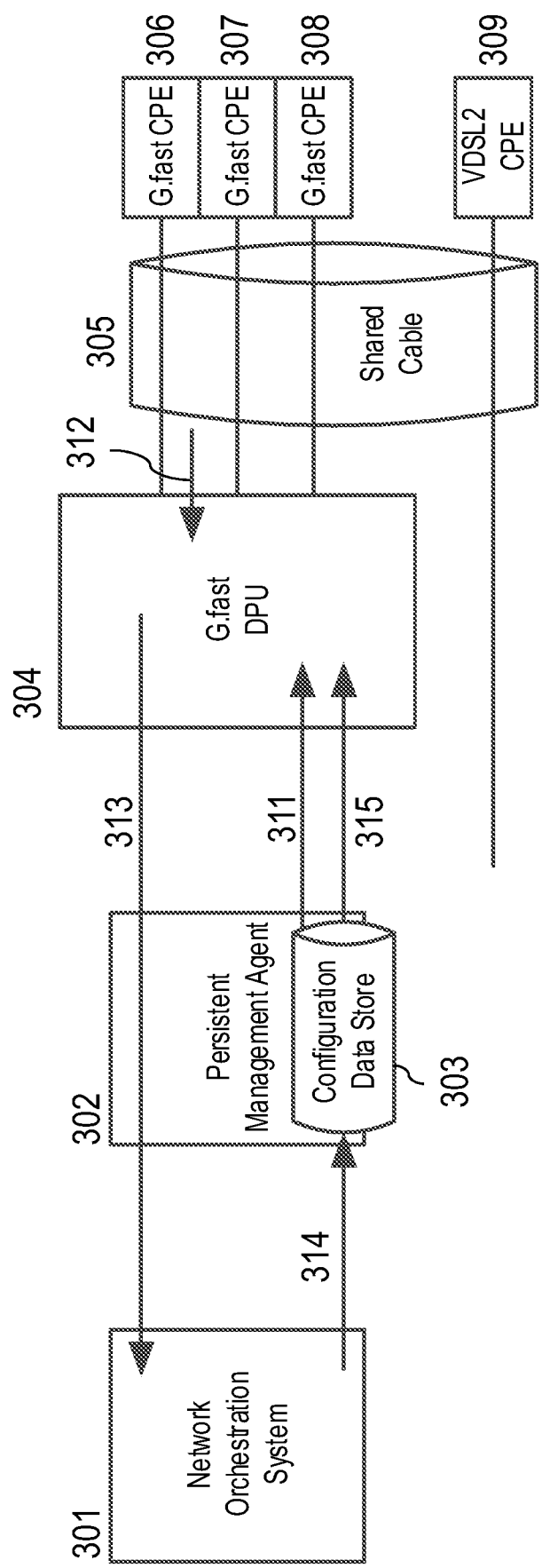
FIG. 3 shows an exemplary diagram visualizing a possible architecture of the solution described herein.

FIG. 3 shows an exemplary diagram visualizing a possible architecture of the solution described herein. It comprises a Network Orchestration System 301, a Persistent Management Agent 302 with a Configuration Data Store 303, a G.fast DPU 304, a shared cable 305, G.fast CPEs 306 to 308 and a VDSL2 CPE 309.

The Network Orchestration System 301 may comprise the SFC Management described above. The Network Orchestration System 301 may refer to an external system, which may be a cloud-based computer system.

The shared cable 305 comprises three G.fast CPEs 306 to 308 and a single VDSL2 CPE 309. As described above, the VDSL2 line may cause crosstalk that is detected by the G.fast system and the lines of the G.fast system are adjusted pursuant to such crosstalk.

The operation of this architecture may exemplarily be described by the following steps:

Step 311: A Crosstalk Detector of the G.fast DPU 304 is configured by the Persistent Management Agent 302 (which might use the Configuration Data Store 303 to access information required for this configuration).

Step 312: The Crosstalk Detector of the G.fast DPU 304 performs measurements and collects results from the G.fast CPEs 306 to 308. As an option, VDSL2 detection algorithms may be run by the G.fast DPU 304.

Step 313: The G.fast DPU 304 reports the results (e.g., an event that indicated that crosstalk has been detected) to an external system, which in this example is the Network Orchestration System 301.

Step 314: The Network Orchestration System 301 (in particular the SFC Management that is located with the Network Orchestration System 301) decides about any reconfiguration of the G.fast DPU 304 that might be necessary. Also, the Network Orchestration System 301 may then re-configure the line configurations of the G.fast DPU 304 via the Persistent Management Agent 302 (by updating the Configuration Data Store 303).

Step 315: The Persistent Management Agent 302 pushes any updated configuration towards the G.fast DPU 304. This can be done without any (significant) delay or when a subsequent re-connection of the respective line is due.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

ALN active line noise
AN Access Node
CPE customer premises equipment (terminal)
DFT discrete Fourier transform
DPU distribution point unit
DS downstream
DSL Digital Subscriber Line
DSLAM DSL Access Multiplexer
FAST Fast Access To Subscriber Terminals
FEXT far-end-crosstalk
FTTB fiber to the building
FTU-O FAST Transceiver Unit-Office
FTU-R FAST Transceiver Unit-Remote
IP Internet Protocol
MSAN Multi Service Access Node
NEXT near-end-crosstalk
PMA Persistent Management Agent PSD power spectral density
QLN quiet line noise
SFC start frequency control
US upstream
VCE Vectoring Control Entity Now, therefore, the following is claimed:

1. A method for operating a first access service depending on the presence of a second access service comprising:
    conducting at least one measurement by the first access service, wherein the at least one measurement detects a crosstalk that results from the second access service, wherein the second access service is a VDSL2 service;
    detecting a presence of the VDSL2 service based on the at least one measurement by evaluating a transition in amplitude of generated noise at a band edge between an upstream VDSL2 band and a downstream VDSL2 band; and
    determining based on the detecting the presence of the VDSL2 service whether or not a power spectral density used by the first access service is adjusted,
    wherein the evaluating comprises:
        determining a first value indicative of a measurement of the generated noise at the band edge in a frequency range of the upstream VDSL2 band;
        determining a second value indicative of a measurement of the generated noise at the band edge in a frequency range of the downstream VDSL2 band; and
        comparing the first value and the second value.

2. The method according to claim 1, wherein:
    the first access service is a communication service utilizing a predetermined number of first lines;
    the second access service is a communication service utilizing an unknown number of second lines; and
    at least one of the first lines and at least one of the second lines share the same cable binder.

3. The method according to claim 1, wherein the first access service is a G.fast service or a service that is based on a G.fast service.

4. The method according to claim 1, wherein adjusting the power spectral density comprises at least one of the following:
    adjusting at least one power spectral density level;
    adjusting a start frequency of a frequency band;
    adjusting at least one frequency of the frequency band; and
    adjusting at least one frequency range of the frequency band,
    wherein the frequency band is used by the first access service.

5. The method according to claim 1, wherein the at least one measurement is conducted by a G.fast DPU and/or by at least one G.fast CPE.

6. The method according to claim 1, wherein the power spectral density is adjusted as follows:
    a start frequency of the first access service is set to a first value if the at least one measurement indicates the presence of crosstalk, or
    the start frequency of the first access service is set to a second value if the at least one measurement indicates the absence of crosstalk,
    wherein the first frequency is higher than the second frequency.

7. The method according to claim 6, wherein the start frequency is set for each line at the same time, at substantially the same time, within a predetermined time interval or when the line is being initialized or re-initialized.

8. The method according to claim 1, wherein several measurements on different lines are conducted at the same time or are spread on different lines over time.

9. The method of claim 1, wherein the presence of the VDSL2 service is further detected by determining a difference between a VDSL2 upstream crosstalk and a VDSL2 downstream crosstalk.

10. A system providing a first access service, comprising:
    at least one digital processing device programmed with instructions that when executed by the at least one digital processing device cause the at least one digital processing device to:
        conduct at least one measurement, wherein the at least one measurement detects a crosstalk that results from a second access service, wherein the second access service is a VDSL2 service;
        detect a presence of the VDSL2 service based on the at least one measurement by evaluating a transition in amplitude of generated noise at a band edge between an upstream VDSL2 band and a downstream VDSL2 band;
        determine based on detection of the presence of the VDSL2 service whether or not a power spectral density used by the first access service is adjusted; and
        adjust the power spectral density of the first access service accordingly or conduct no adjustment of the power spectral density,
    wherein the evaluating comprises:
        determining a first value indicative of a measurement of the generated noise at the band edge in a frequency range of the upstream VDSL2 band;
        determining a second value indicative of a measurement of the generated noise at the band edge in a frequency range of the downstream VDSL2 band; and
        comparing the first value and the second value.

11. The system according to claim 10, wherein the system comprises at least one of the following:
    a DPU; and
    a management system to configure the DPU.

12. The system according to claim 10, wherein:
    the first access service is a communication service utilizing a predetermined number of first lines;
    the second access service is a communication service utilizing an unknown number of second lines; and
    at least one of the first lines and at least one of the second lines share the same cable binder.

13. The system according to claim 10, wherein the first access service is a G.fast service or a G.fast-based service.

14. The system of claim 10, wherein the presence of the VDSL2 service is further detected by determining a difference between a VDSL2 upstream and a VDSL2 downstream crosstalk.

15. A non-transitory computer-readable medium encoded with a computer program that, when executed by at least one digital processing device, causes the at least one digital processing device to perform the following steps:
    conducting at least one measurement, wherein the at least one measurement detects a crosstalk that results from a second access service, wherein the second access service is a VDSL2 service;
    detecting a presence of the VDSL2 service based on the at least one measurement by evaluating a transition in amplitude of generated noise at a band edge between an upstream VDSL2 band and a downstream VDSL2 band;

determining based on the detecting the presence of the VDSL2 service whether or not a power spectral density used by the first access service is adjusted; and adjusting the power spectral density of the first access service accordingly or conduct no adjustment of the power spectral density, wherein the evaluating comprises:

determining a first value indicative of a measurement of the generated noise at the band edge in a frequency range of the upstream VDSL2 band;

determining a second value indicative of a measurement of the generated noise at the band edge in a frequency range of the downstream VDSL2 band; and comparing the first value and the second value.

16. The non-transitory computer-readable medium of claim 15, wherein the presence of the VDSL2 service is further detected by determining a difference between a VDSL2 upstream and a VDSL2 downstream crosstalk.

* * * * *